(12) United States Patent
Radford et al.

(10) Patent No.: US 11,500,627 B2
(45) Date of Patent: Nov. 15, 2022

(54) CHECKING SYSTEM

(71) Applicant: PLATINUM TRAINING SERVICES LTD, Chepstow (GB)

(72) Inventors: Kenneth Mark Radford, Chepstow (GB); Matthew James Radford, Chepstow (GB)

(73) Assignee: PLATINUM TRAINING SERVICES LTD, Chepstow (GB)

( * ) Notice: Subject to any disclaimer, the term of this patent is extended or adjusted under 35 U.S.C. 154(b) by 65 days.

(21) Appl. No.: 17/101,143

(22) Filed: Nov. 23, 2020

(65) Prior Publication Data
US 2021/0200534 A1 Jul. 1, 2021

(30) Foreign Application Priority Data

Nov. 22, 2019 (GB) ...................................... 1917084

(51) Int. Cl.
*G06F 9/44* (2018.01)
*G06F 9/455* (2018.01)
(Continued)

(52) U.S. Cl.
CPC .................. *G06F 8/71* (2013.01); *G06F 9/54* (2013.01); *G06F 16/248* (2019.01); *G06F 21/31* (2013.01); *G06Q 10/06395* (2013.01); *G06Q 10/06398* (2013.01); *G06Q 10/105* (2013.01); *G06Q 40/02* (2013.01); *G06Q 50/205* (2013.01); *H04L 63/0272* (2013.01)

(58) Field of Classification Search
CPC ........ G06F 2201/84; G06F 3/067; G06F 8/65; G06F 16/214; G06F 9/45558; G06F 21/57; G06F 2221/034; G05B 23/0254; G06N 20/00; G06N 5/04
See application file for complete search history.

(56) References Cited

U.S. PATENT DOCUMENTS 10,452,389 B2* 10/2019 Kronmueller .... G05B 19/41885
10,756,970 B1* 8/2020 Hermoni ............. H04L 41/0836
(Continued)

FOREIGN PATENT DOCUMENTS

WO 2018160427 A1 9/2018

OTHER PUBLICATIONS

Alaerjan et al., Configuring DDS features for communicating components in smart grids, 8 pages (Year: 2017).*
(Continued)

*Primary Examiner* — Thuy Dao
(74) *Attorney, Agent, or Firm* — Meunier Carlin & Curfman LLC

(57) ABSTRACT

A system for checking modifications made to re-configurable hardware and software is described. An example system includes re-configurable hardware and software; a checking tool having a configuration data connection to the re-configurable hardware and software, the checking tool configured to obtain configuration data comprising configuration changes made to the re-configurable hardware and software; a comparator having a comparison data connection to the checking tool, the comparator configured to compare the configuration data with customised configurations within a scoring engine to produce a score for the configuration data; a set and reset initiator having an instruction data connection to a management system; and a hardware and software set and reset tool having an initiation data connection to the set and reset initiator and having a set and reset data connection to the re-configurable hardware and software, the hardware and software set and reset tool configured to reset the re-configurable hardware and software to a predetermined state.

11 Claims, 4 Drawing Sheets

(51) Int. Cl.
  *G06F 9/445* (2018.01)
  *G06F 8/71* (2018.01)
  *G06F 16/248* (2019.01)
  *G06F 9/54* (2006.01)
  *G06F 21/31* (2013.01)
  *G06Q 10/06* (2012.01)
  *G06Q 10/10* (2012.01)
  *G06Q 40/02* (2012.01)
  *G06Q 50/20* (2012.01)
  *H04L 9/40* (2022.01)

(56) References Cited

U.S. PATENT DOCUMENTS

| | | | | |
|---|---|---|---|---|
| 10,963,435 B1* | 3/2021 | McAlister | ........... | G06F 11/0766 |
| 2002/0120737 A1* | 8/2002 | Martin | ................ | H04Q 3/0087 |
| | | | | 709/224 |
| 2011/0035755 A1* | 2/2011 | Huang | ................ | G06F 9/4856 |
| | | | | 718/106 |
| 2012/0303965 A1* | 11/2012 | Carter | ................ | G06F 21/6218 |
| | | | | 726/17 |
| 2016/0210289 A1* | 7/2016 | Esinovskaya | ..... | G06F 16/24578 |
| 2019/0034113 A1* | 1/2019 | Ahmad | ................ | G06F 3/0619 |
| 2020/0218566 A1* | 7/2020 | Maes | .................... | G06F 9/5072 |
| 2020/0403864 A1* | 12/2020 | Saenger | ............. | G06F 9/44505 |

OTHER PUBLICATIONS

Combined Search Report under Section 17(5)(b) and Abbreviated Examination Report under Section 18(3) dated May 11, 2020, issued in connection with United Kingdom Application No. GB1917084.4, 9 pages.

Communication pursuant to Article 94(3) EPC dated Jun. 29, 2022, issued in European Patent Application No. 20209079.1, 9 pages.

Extended European search report dated Mar. 31, 2021, issued in European Patent Application No. 20209079.1, 9 pages.

* cited by examiner

CHECKING SYSTEM

TECHNICAL FIELD

Embodiments of the present invention relate generally to a system for checking modifications made to re-configurable hardware and software.

INTRODUCTION

This invention relates to a system for checking modifications made to re-configurable hardware and software. The system can be used as a management tool for checking modifications made to an IT system during upgrades, routine maintenance and whilst solving problems that have been encountered. The system can also be used as a performance-based testing system that administers a practical examination to candidates in order to test them on their skills in configuring hardware and software rather than merely their theoretical knowledge.

In relation to practical examinations, it is known for employers to test employees, or prospective employees, using multiple choice examinations, whereby a question or scenario is posed to an employee and that employee selects an answer from the multiple options. An employee is able to pass such a test by merely memorising information and then recalling it, without having to have the skill set that their employer wants them to have. There is a need for a robust system for setting an examination to test the skill set of an examination candidate, the examination to be undertaken using real hardware and software, and for a system for checking the candidate's answer to assess their skills.

SUMMARY

A checking system comprising: re-configurable hardware and software; a checking tool having a configuration data connection to the re-configurable hardware and software, wherein the checking tool is configured to obtain configuration data comprising configuration changes made to the re-configurable hardware and software; a comparator having a comparison data connection to the checking tool, wherein the comparator is configured to compare the configuration data with customised configurations within a scoring engine to produce a score for the configuration data; a set and reset initiator having an instruction data connection to a management system; and a hardware and software set and reset tool having an initiation data connection to the set and reset initiator and having a set and reset data connection to the re-configurable hardware and software, wherein the hardware and software set and reset tool is configured to reset the re-configurable hardware and software to a predetermined state.

Preferably the checking system further comprises a session transcript recorder having a recordal data connection to the checking tool.

Preferably the checking system further comprises a session transcript checker having an interrogation data connection to the session transcript recorder.

Preferably the checking system further comprises a pseudo-random question generator.

Preferably the checking system further comprises a smart item allocator.

Preferably the checking system further comprises an application programming interface caller.

Preferably the checking system with the programming interface caller further comprises an authorisation token, wherein the authorisation token is attached to application programming interface calls made by the application programming interface caller between the checking tool and the re-configurable hardware and software.

Preferably the checking system further comprises a management system, wherein the checking system is connected to the management system.

Preferably the checking system further comprises a registration, payment and scheduling system, wherein the checking system is connected to the registration, payment and scheduling system.

Preferably the checking system further comprises a delivery system, wherein the checking system is connected to the delivery system.

Preferably the re-configurable hardware and software is connected to a portal via a virtual private network.

Preferably the re-configurable hardware and software comprises storage, a server and networking devices.

Preferably the checking tool creates a set of results in the form of a JavaScript Object Notation string.

SPECIFIC DESCRIPTION

Figure 1:
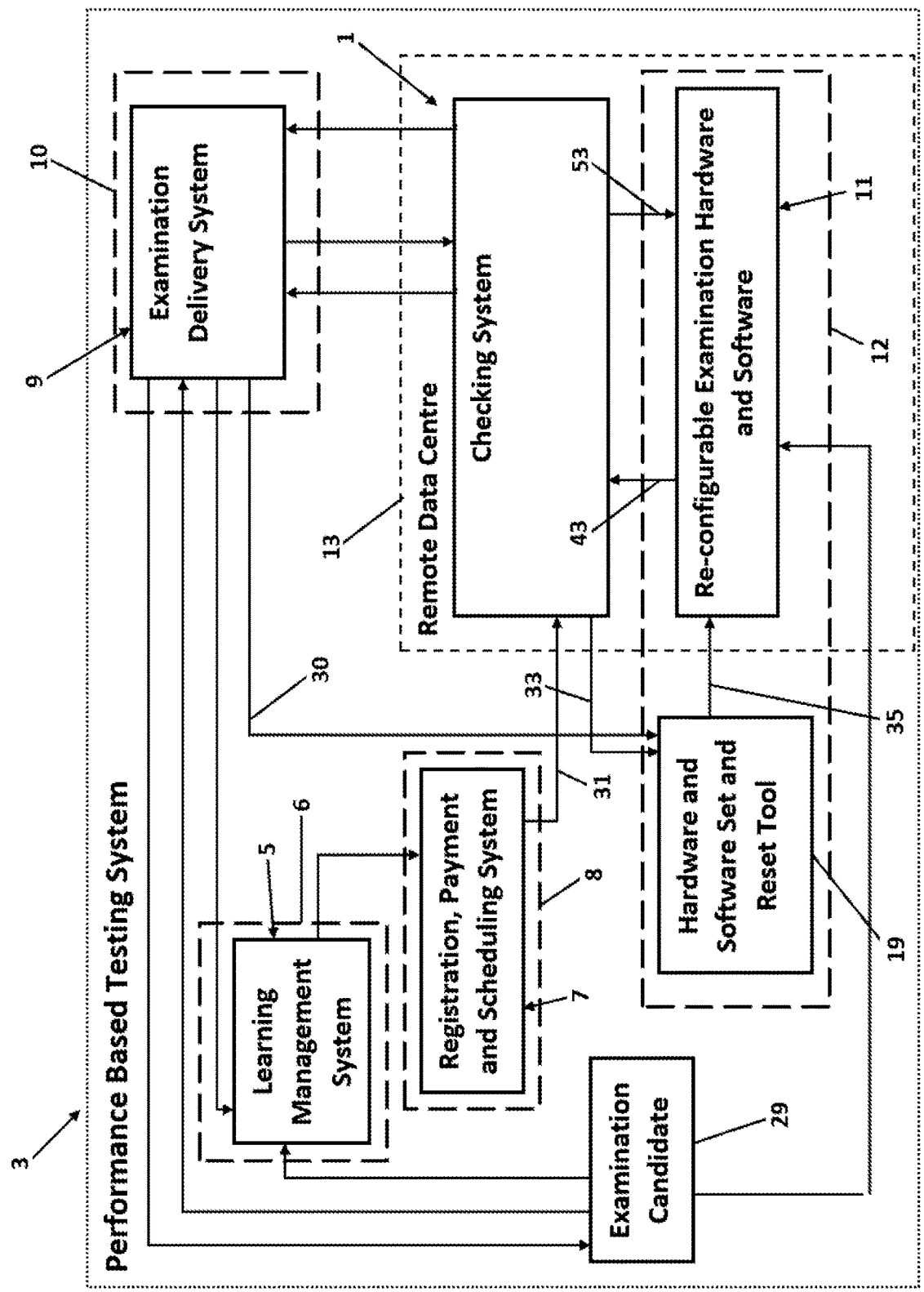
FIG. 1 is a block diagram showing an overview of a performance-based testing system including the checking system 1 of the present invention.
Figure 2:
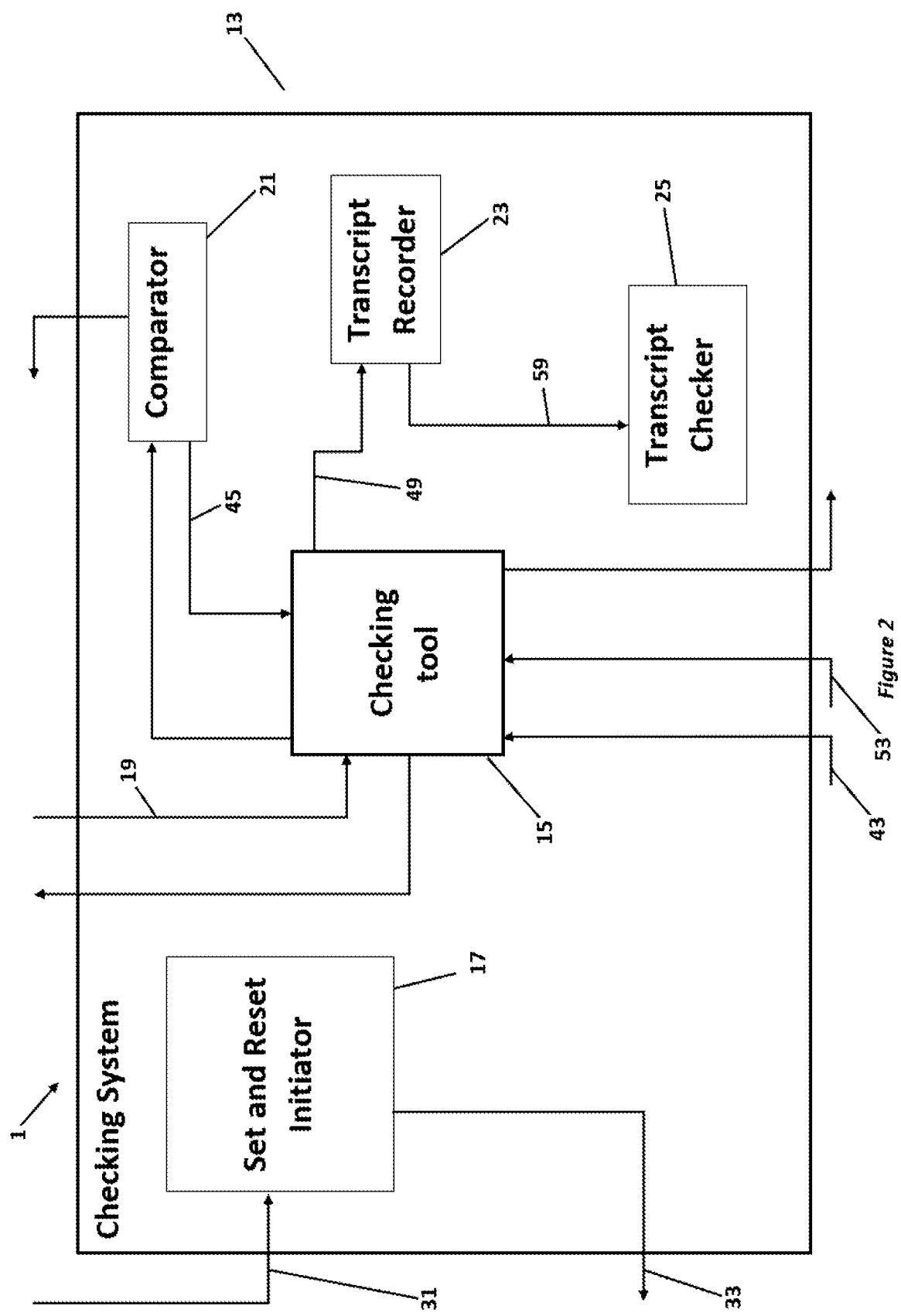
FIG. 2 is a block diagram showing a detailed view of the checking system of the present invention.
Figure 3:
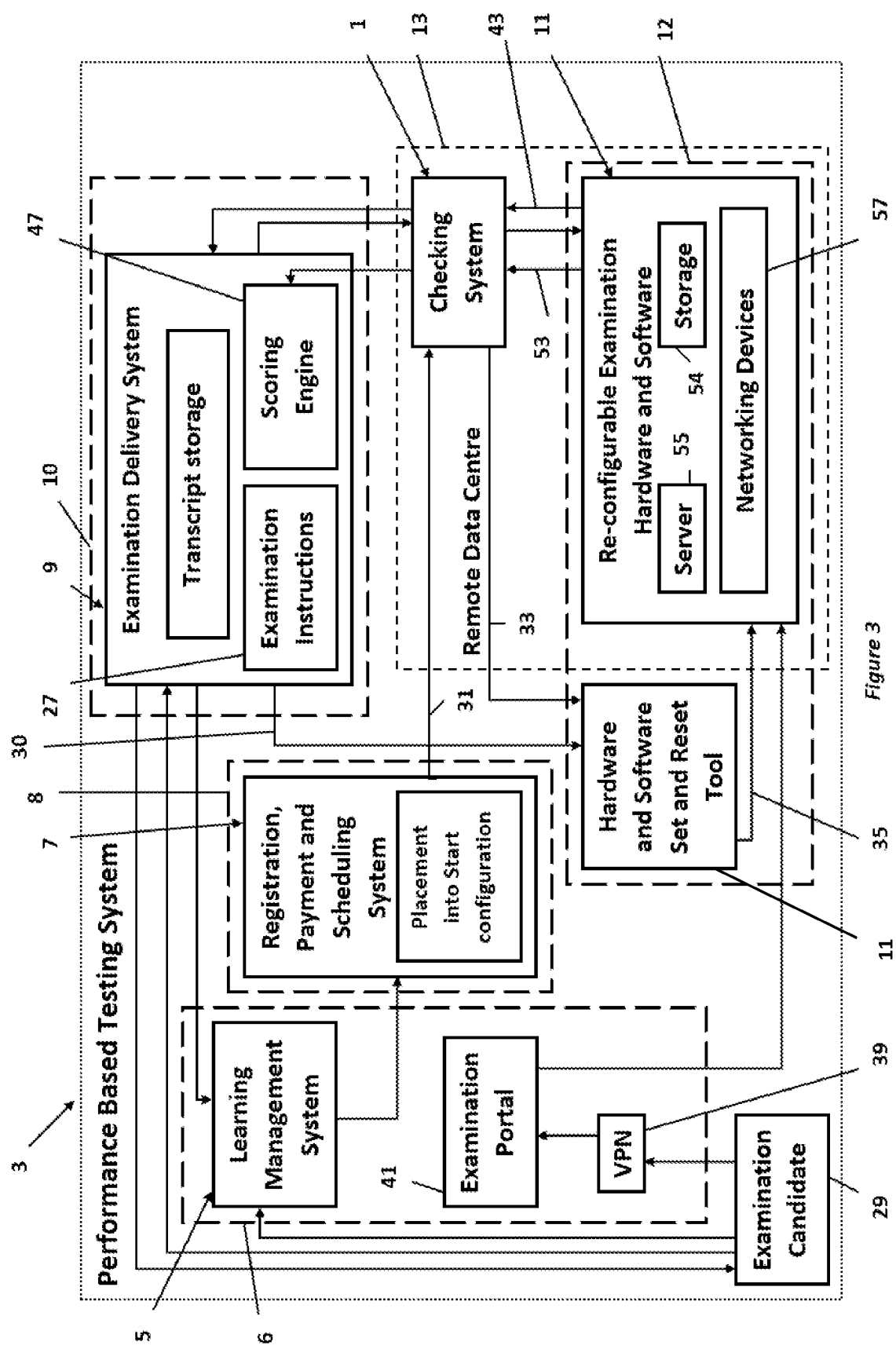
FIG. 3 is a block diagram showing a detailed view of the examination elements of the performance-based testing system.
Figure 4:
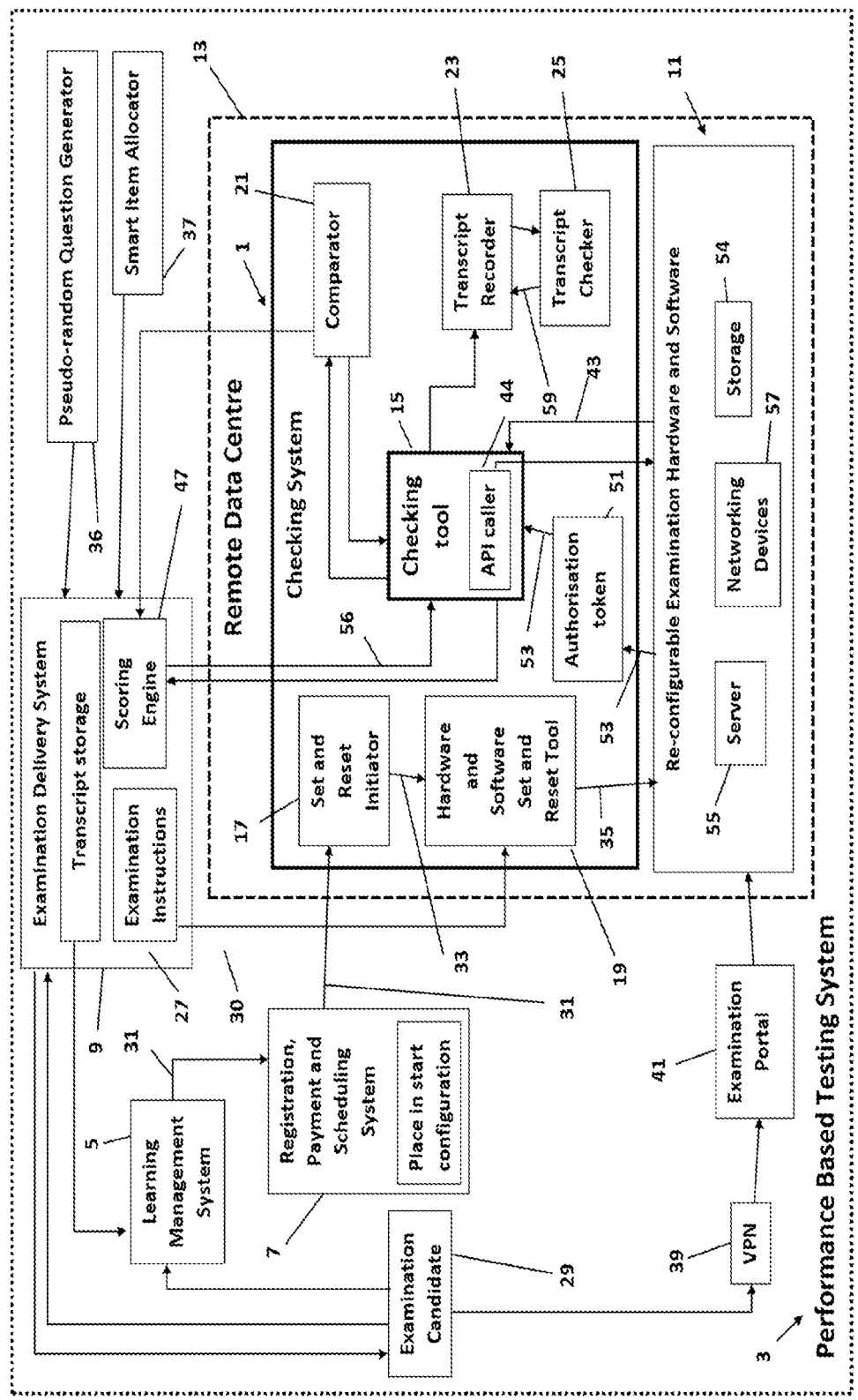
FIG. 4 is a block diagram showing a detailed view of a performance-based testing system including the checking system 1 of the present invention.

The checking system can be used by an IT manager as a tool for checking changes to hardware and software configurations that have been made, for example, in response to solving problems encountered or when changing or upgrading an IT system. The checking system 1 can also be used with a performance-based testing system 3 that administers practical examinations on live hardware and software. A checking system for such use is described with reference to FIGS. 1 to 4.

The performance-based testing system 3 comprises a learning management system 5 located within a learning management environment 6, a registration, payment and scheduling system 7 located within a scheduling environment 8, an examination delivery system 9 located within an examination delivery environment 10 and re-configurable examination hardware and software 11 located within an examination hardware and software environment 12. The checking system 1 and the re-configurable examination hardware and software 11 are located in a remote data centre 13. The checking system 1 runs on a server located within the remote data centre 13.

The checking system 1 comprises a checking tool 15, a set and reset initiator 17, a comparator 21, a transcript recorder 23 and a transcript checker 25.

A hardware and software set and reset tool 19 is included within the examination hardware and software environment 12.

A set of examination instructions 27 for an examination is drawn up and stored within the examination delivery system 9.

An examination candidate 29 accesses the learning management system 5, for example via a website or app. The examination candidate 29 is directed to the registration, payment and scheduling system 7 and creates a candidate registration, books an examination time slot for taking the examination and pays the examination fee. The examination candidate 29 is provided with log-in details for the examination delivery system 9.

The registration, payment and scheduling system 7 communicates with the set and reset initiator 17, via an instruction data connection 31, and instructs that the re-configurable examination hardware and software 11 is set to a starting configuration, in advance of the examination time slot that the examination candidate 29 has booked.

The set and reset initiator 17 sends a message to the hardware and software set and reset tool 19, via an initiation data connection 33 and the hardware and software set and reset tool 19 ensures that the re-configurable examination hardware and software 11 is correctly set before the examination candidate 29 takes the examination, by communication with the examination hardware and software 11 via a set and reset data connection 35. The hardware and software configurations for the starting configuration are supplied to the hardware and software set and reset tool 19 by the examination delivery system 9, via a configuration connection 30. This allows the re-configurable hardware and software 11 to be set to a variety of different states, whilst enabling the re-configurable hardware and software 11 to quickly be reset for further usage.

In order to take the examination, the examination candidate 29 logs into the examination delivery system 9, using the log-in details obtained from the learning management system 5, ensuring that the candidate is properly identified and is not being assisted by a third-party. The examination candidate 29 is provided with a set of examination instructions 27. The examination delivery system 9 prepares the examination instructions 27 using a pseudo-random question generator 36, to select one or more questions from a store of pre-prepared questions, and using a smart item allocator 37, which changes parameters within those selected questions. The questions relate to, for example, theoretical customer scenarios. A customer scenario might be, for example, as follows: 'Your customer has requested that you configure a proof of concept for a highly available virtualized computer, storage and networking environment. They have specifically requested that you configure eight virtual machines, each with four 500 GB thinly provisioned virtual volumes. They also need the virtual machines connected to a highly available network environment. Use the hardware and software at your disposal to configure the proof of concept'. The examination instructions 27 also contain log-in information to enable the examination candidate 29 to log in to the re-configurable examination hardware and software 11, again ensuring that the candidate is properly identified and is not being assisted by a third party.

The examination candidate 29 commences the examination process by connecting to the re-configurable examination and hardware 11 via a virtual private network (VPN) 39 and an examination portal 41. The examination candidate 29 then makes changes to the configuration of the re-configurable examination hardware and software 11 in order to answer the questions being posed by the examination. The examination candidate 29 submits their answer, i.e. a set of new hardware and software configurations, by pressing a submit button.

The submission of an answer by the examination candidate 29 is communicated to the checking tool 15 via an answer data connection 43. The checking tool 15 then makes application programming interface (API) calls, using an application programming interface (API) caller 44, to the re-configurable examination hardware and software 11 in order to obtain the configuration changes that the examination candidate 29 has made.

An initial API call from the checking tool 15 to the re-configurable hardware and software 11 using the API caller 44 obtains an authorization token 51. The authorization token 51 is obtained by the checking tool 15 providing to the re-configurable hardware and software 11 a unique identifier that it has obtained from the examination delivery system 9 via an identification data connection 53. The checking tool 15 stores the token 51. Future API calls from the checking tool 15 use the authorisation token 51.

When the examination candidate 29 has completed the configuration of the re-configurable examination hardware and software 11 according to the requirements set out in the examination question, they press the submit button. Upon the submit button being pressed the checking tool 15 interrogates the re-configurable hardware and software 11 to obtain configuration data comprising configuration changes made to the re-configurable hardware and software 11 during the examination and the checking tool passes the configuration data to the comparator 21 via a comparison data connection 45 and an API return body. The comparator 21 compares each configuration change in the configuration data to customized configurations within a scoring engine 47 and then passes a score back to the checking tool 15. The customized configurations within the scoring engine 47 to provide a guide that is used to score the configuration changes and provide an evaluation of the quality of the answer provided by the examination candidate 29. This results in a more robust, flexible and efficient checking system for accurately evaluating the reconfiguration of the re-configurable hardware and software 11. The comparison and scoring process has been completed once all of the configurations have been passed through the comparator 21. Completion of the process results in the examination candidate 29 being logged out of the re-configurable examination hardware and software 11.

For example, the checking tool 15 makes a storage API call to the re-configurable hardware and software 11, wherein that call contains the authorisation token 51. In response, the re-configurable hardware and software 11 passes to the checking tool 15 storage configuration data relating to the storage 53 that is a part of the re-configurable hardware and software 11. The checking tool 15 passes the storage configuration data to the comparator 21 and the comparator 21 compares the storage configuration data to the customized configurations within the scoring engine 47. Items such as the number of volumes, the names of the volumes and the volume settings are checked.

The checking tool 15 will also make a server API call to the re-configurable hardware and software 11, wherein that call contains the authorisation token 51. In response, the re-configurable hardware and software 11 passes to the checking tool 15 server configuration data relating to servers 55 that is a part of the re-configurable hardware and software 11. Items such as the server profiles, the profile names and the profile settings are checked.

The checking tool 15 will create a set of results data in the form of a JavaScript Object Notation (JSON) string and will send that set of results data to the examination delivery system 9. The checking tool 15 associates the set of results data with the unique identifier for the examination candidate 29.

A transcript of the examination session of the examination candidate 29 is recorded by the examination session transcript recorder 23, via a recordal data connection 49. The examination transcript is stored for future reference. If, for example, an examination candidate 29 fails the examination and wishes to know why, then the examination session transcript checker 25 is used to interrogate the examination transcript, via an interrogation data connection 59 and provide a report as to the reasons for the failure.

The invention claimed is:

1. A checking system comprising:
   (i) re-configurable hardware and software;
   (ii) a checking tool having a configuration data connection to the re-configurable hardware and software, wherein the checking tool is configured to obtain configuration data comprising configuration changes made to the re-configurable hardware and software;
   (iii) a comparator having a comparison data connection to the checking tool, wherein the comparator is configured to compare the configuration data with customised configurations within a scoring engine to produce a score for the configuration data;
   (iv) a set and reset initiator having an instruction data connection to a management system;
   (v) a hardware and software set and reset tool having an initiation data connection to the set and reset initiator and having a set and reset data connection to the re-configurable hardware and software, wherein the hardware and software set and reset tool is configured to reset the re-configurable hardware and software to a predetermined state;
   (vi) an application programming interface caller; and
   (vii) an authorisation token, wherein the authorisation token is attached to application programming interface calls made by the application programming interface caller between the checking tool and the re-configurable hardware and software.

2. The checking system of claim 1, further comprising a session transcript recorder having a recordal data connection to the checking tool.

3. The checking system of claim 2, further comprising a session transcript checker having an interrogation data connection to the session transcript recorder.

4. The checking system of claim 1, further comprising a pseudo-random question generator.

5. The checking system of claim 1, further comprising a smart item allocator.

6. The checking system of claim 1, further comprising a learning management system, wherein the checking system is connected to the learning management system.

7. The checking system of claim 1, further comprising a registration, payment and scheduling system, wherein the checking system is connected to the registration, payment and scheduling system.

8. The checking system of claim 1, further comprising a delivery system, wherein the checking system is connected to the delivery system.

9. The checking system of claim 1 wherein the re-configurable hardware and software is connected to a portal via a virtual private network.

10. The checking system of claim 1 wherein the re-configurable hardware and software comprises storage, a server and networking devices.

11. The checking system of claim 1 wherein the checking tool creates a set of results in the form of a JavaScript Object Notation string.

* * * * *